US007170071B1

(12) United States Patent
Broussard

(10) Patent No.: US 7,170,071 B1
(45) Date of Patent: Jan. 30, 2007

(54) INFRARED EMITTER

(76) Inventor: Richard D. Broussard, 104 Presidential Ct., Lafayette, LA (US) 70503

( * ) Notice: Subject to any disclaimer, the term of this patent is extended or adjusted under 35 U.S.C. 154(b) by 191 days.

(21) Appl. No.: 10/955,096

(22) Filed: Sep. 29, 2004

(51) Int. Cl.
*G01J 5/06* (2006.01)

(52) U.S. Cl. ................................ 250/495.1; 250/493.1

(58) Field of Classification Search ............ 250/495.1, 250/493.1, 504 R
See application file for complete search history.

(56) References Cited

U.S. PATENT DOCUMENTS

| | | | | |
|---|---|---|---|---|
| 3,410,559 | A | 11/1968 | Miller, Jr. et al. | |
| 3,955,292 | A | 5/1976 | Robertsson | |
| 4,356,984 | A | 11/1982 | Worth et al. | |
| 4,428,583 | A | 1/1984 | Feagle | |
| 4,607,849 | A | 8/1986 | Smith et al. | |
| 4,838,167 | A * | 6/1989 | Prahauser et al. | 102/334 |
| 5,317,163 | A | 5/1994 | Obkircher | |
| 5,401,976 | A * | 3/1995 | Bannasch | 250/495.1 |
| 5,497,156 | A | 3/1996 | Bushman | |
| 5,592,850 | A | 1/1997 | Rowan | |
| 6,031,970 | A | 2/2000 | Nordal et al. | |
| 6,600,165 | B1 | 7/2003 | Doe et al. | |
| 6,634,593 | B2 | 10/2003 | Lepretre et al. | |

FOREIGN PATENT DOCUMENTS

| | | |
|---|---|---|
| WO | WO9727446 | 7/1997 |

* cited by examiner

*Primary Examiner*—Kiet T. Nguyen
(74) *Attorney, Agent, or Firm*—William W. Stagg

(57) ABSTRACT

An infrared emitter for use with self-propelled aerial targets used to simulate jet aircraft for use as a target for anti-aircraft missile systems. The emitter provides an infrared source that simulates the infrared energy produced by an aircraft. The emitter incorporates a network of platinum beads that are arranged along and between a plurality of parallel stainless steel screens. The network is contained in a heating conduit that is secured to a housing. The housing is provided with an opening to allow for attachment to the exhaust ports of a self-propelled aerial target's engine. Combustion gases produced by the aerial target's engine are expelled through the exhaust port and pass through to the emitter. The gases heat the network of beads and screens thereby causing the network to emit an infrared signature such that the heat seeking/sensing mechanisms of anti-aircraft missiles systems are able to locate and direct the missile to the target. The technology is also applicable to surface targets for both marine and land applications.

6 Claims, 4 Drawing Sheets

INFRARED EMITTER

FIELD OF INVENTION

The present invention relates to the field of infrared emitters. More particularly it pertains to a new infrared emitter used in connection with self-propelled aerial targets used for practice detection.

BACKGROUND OF INVENTION

Military missile systems are often used to defend and guard against airborne attack. A majority of these systems utilize missiles that are equipped with some type of infrared guiding mechanism. Such missiles recognize targets by detecting the infrared signature emitted from the target's power source. Upon recognition, these "heat seeking" missiles are adjusted or moved along a trajectory leading to the destruction of the target. In order to test the accuracy of these missiles as well as their performance under real conditions, aerial targets are required for simulation, practice and testing of missile systems.

Self-propelled unmanned aircraft or "drones" are used as targets for practice detection of missile systems. These targets often employ some type of emitter to produce the desired infrared signature. Such infrared emitters are used with self-propelled aerial targets to simulate jet aircraft for use as a target for anti-aircraft missile systems.

Self-propelled unmanned land vehicles as well as watercraft are also used as targets for practice detection of missile systems. Infrared emitters may also be used with these surface targets, whether on land or on water, to provide the infrared signature necessary for simulation, practice and testing of missile systems designed for land or naval defense systems.

The present invention provides a new infrared emitter that does not require the independent burning of any type of fuel to produce the desired infrared signature and eliminates the need for fuel piping or conduit systems for the emitter. The present invention improves upon the efficiency of the aerial, land and marine targets by providing an infrared emitter that is portable and is easily attachable to the engine exhaust ports of the target engine.

SUMMARY OF INVENTION

The present invention provides a new infrared signal emitter for use with self-propelled aerial targets used for practice detection. The emitter does not require an independent igniter system to generate the signal and thus eliminates the potential for igniter malfunction as well as the need for complicated conduit systems. The present invention is designed to attach to the engine exhaust system of a self-propelled target, such as an aerial target having an aircraft shaped body and an engine propulsion means.

The invention includes a housing and a plurality of rectangular heating conduits. The housing has a bottom wall, top wall, and two side walls that are positioned opposite each other such that a channel is formed. The end of each wall has a flanged portion to allow for engagement with the heating conduits. Also provided in at least one of the side walls is an opening to allow for attachment of the housing to the exhaust system of the target's engine such as that typically employed on self-propelled aerial targets.

The heating conduits form an enclosure, such as a rectangular box shape having a top wall, a bottom wall, and two side walls, equipped with an attachment means for securing the heating conduits to the housing. The heating conduits contain a network of screens and heat resistant beads, such as platinum or palladium coated metal beads of the type typically used in catalytic converters. The network is comprised of a plurality of screens that extend vertically and parallel to each other, and a plurality of platinum coated beads that are disposed along and between the plurality of screens. The emitter includes deflector portions secured to each heating conduit and produces a glow in a required infrared spectrum when heated to a desired temperature range. The emitter of the present invention will typically withstand sustained heat in the range of 750 to 800 degrees Centigrade or greater and will typically produce an energy density in the range of fifteen (15) to twenty (20) watts per steradian in the mid-band of the infrared spectrum, a wave length of 3–5 microns.

In use, the infrared emitter is attached to the engine exhaust system of the self-propelled target vehicle by way of the opening in the emitter housing. The target is equipped with a propulsion means, such as a single stroke engine, that produces hot gases in its combustion chamber. These hot combustion gases are expelled from the engine combustion chamber through the engine exhaust port into the emitter. The expelled combustion gases heat the beads causing the beads to glow and in turn produce an infrared signature. This infrared signature provides a signal that is detectible by the missile guidance systems of "heat seeking" missiles to allow a missile to seek and destroy the target.

The applicant's invention resides not in any one of these features per se, but rather in the particular combination of all of them herein disclosed and claimed in this particular combination of all of its structures for the functions specified.

There has thus been outlined, rather broadly, the more important features of the invention in order that the detailed description thereof that follows may be better understood, and in order that the present contribution to the art may be better appreciated.

There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Applicant's invention provides a convenient and efficient infrared emitter that can be used in connection with self-propelled targets, such as aerial targets, used for practice detection for missile systems. The disclosed infrared emitter is dependable, reliable, simple to assemble and simple to manufacture. For a better understanding of the invention, its operating advantages and the specific objects attained by its uses, reference should be made to the accompanying drawings and descriptive matter.

DRAWINGS—REFERENCE NUMERALS

Figure 1:
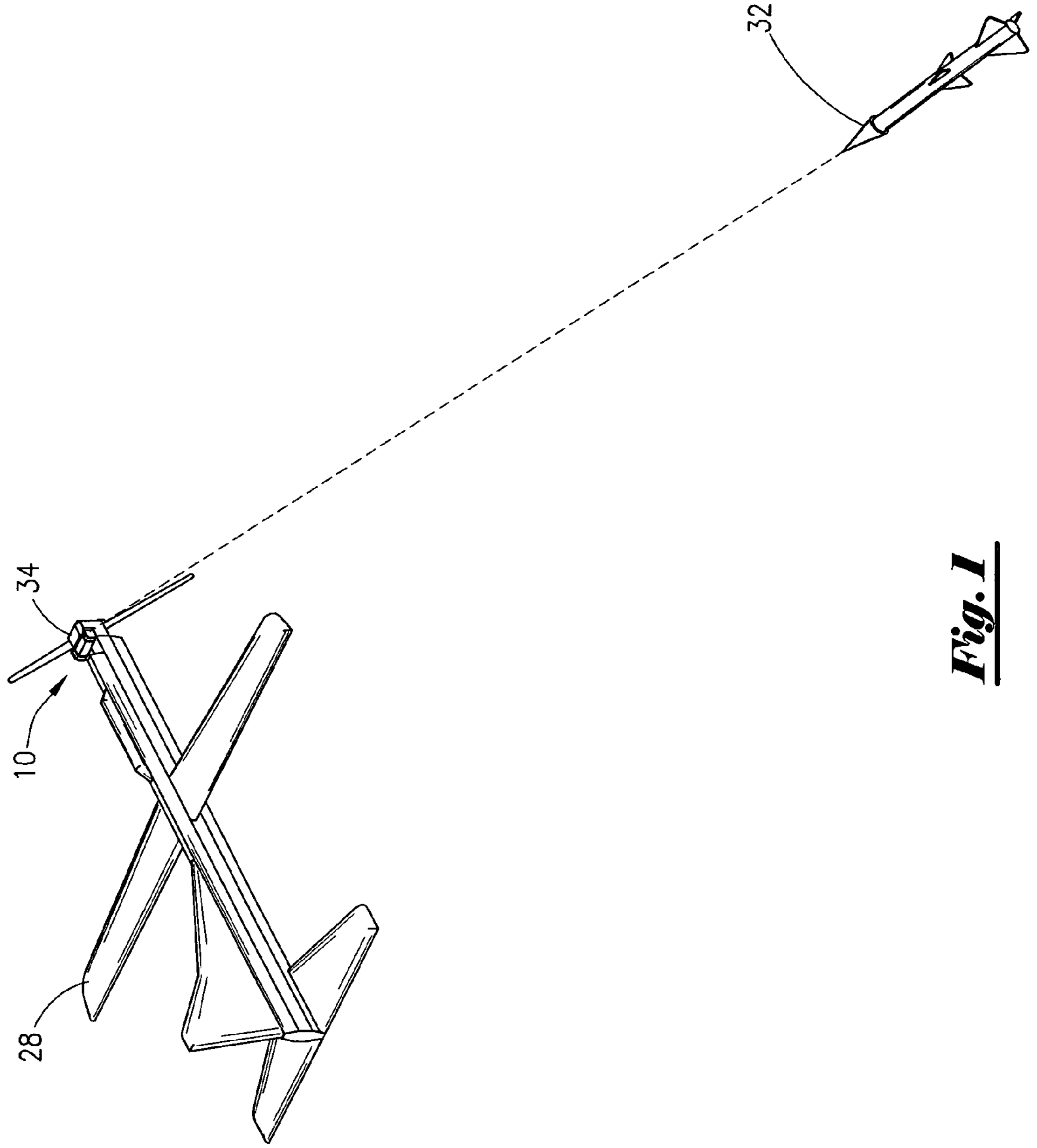
FIG. 1 is a perspective view of a self-propelled aerial target equipped with the Applicant's infrared emitter for use in conjunction with a "heat seeking" missile.

10 Infrared Emitter
12 Screens
13 Screens
14 Beads
16 Heating conduits
18 Housing
20 Housing opening
22 Bores
24 Attachment bolts
26 Attachment means
28 Self-propelled aerial target
30 Flange portion
32 Missile
34 Engine
36 Deflector portion

DETAILED DESCRIPTION OF THE INVENTION

The Applicant's claimed invention is shown in detail in FIGS. 1–5. It will be appreciated by those of ordinary skill in the art that the description given herein with respect to these Figures is for exemplary purposes only and is not intended in any way to limit the scope of the invention. It will also be appreciated that the description provided herein for an aerial target will also be readily adapted to surface targets such as self-propelled marine and land vehicle targets.

Referring now to FIG. 1, there is shown a self-propelled aerial target 28 having a heat-producing engine 34, such as a single stroke combustion engine. An infrared emitter 10 in accordance with the claimed invention is shown mounted to the exhaust system of the engine 34. Mounting the emitter 10 on the target 28 in this manner will provide and enhanced infrared target signal from the heat generated by the engine 34 for detection by the "heat seeking" guidance system of the missile 32.

Figure 2:
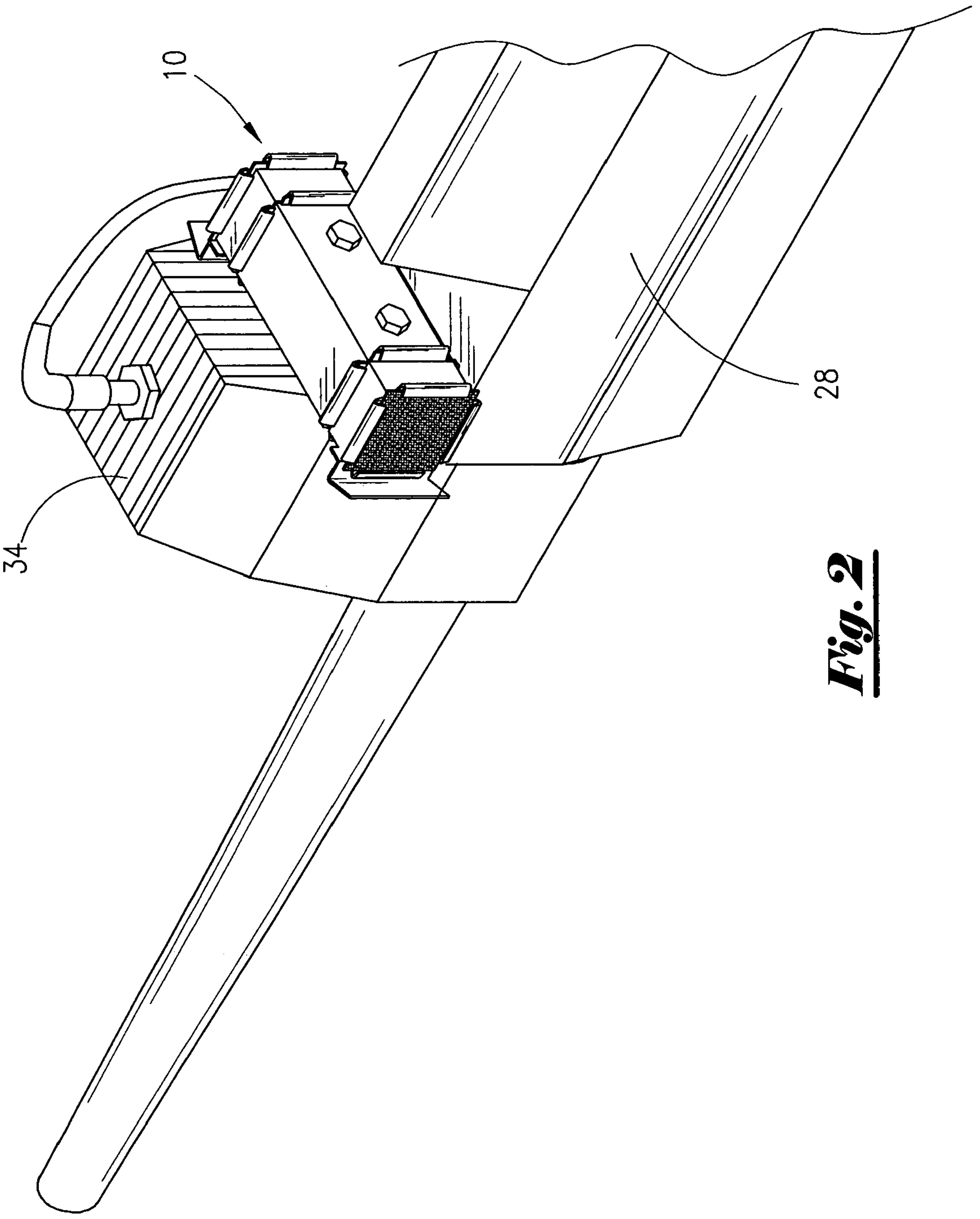
FIG. 2 is a perspective view of the Applicant's infrared emitter in conjunction with the self-propelled aerial target's engine.

FIG. 2 shows a perspective view of the Applicant's infrared emitter 10 in conjunction with the engine 34 of the self-propelled aerial target 28. The emitter 10 is configured in a compact box-like package that readily attaches to an engine exhaust system.

Figure 3:
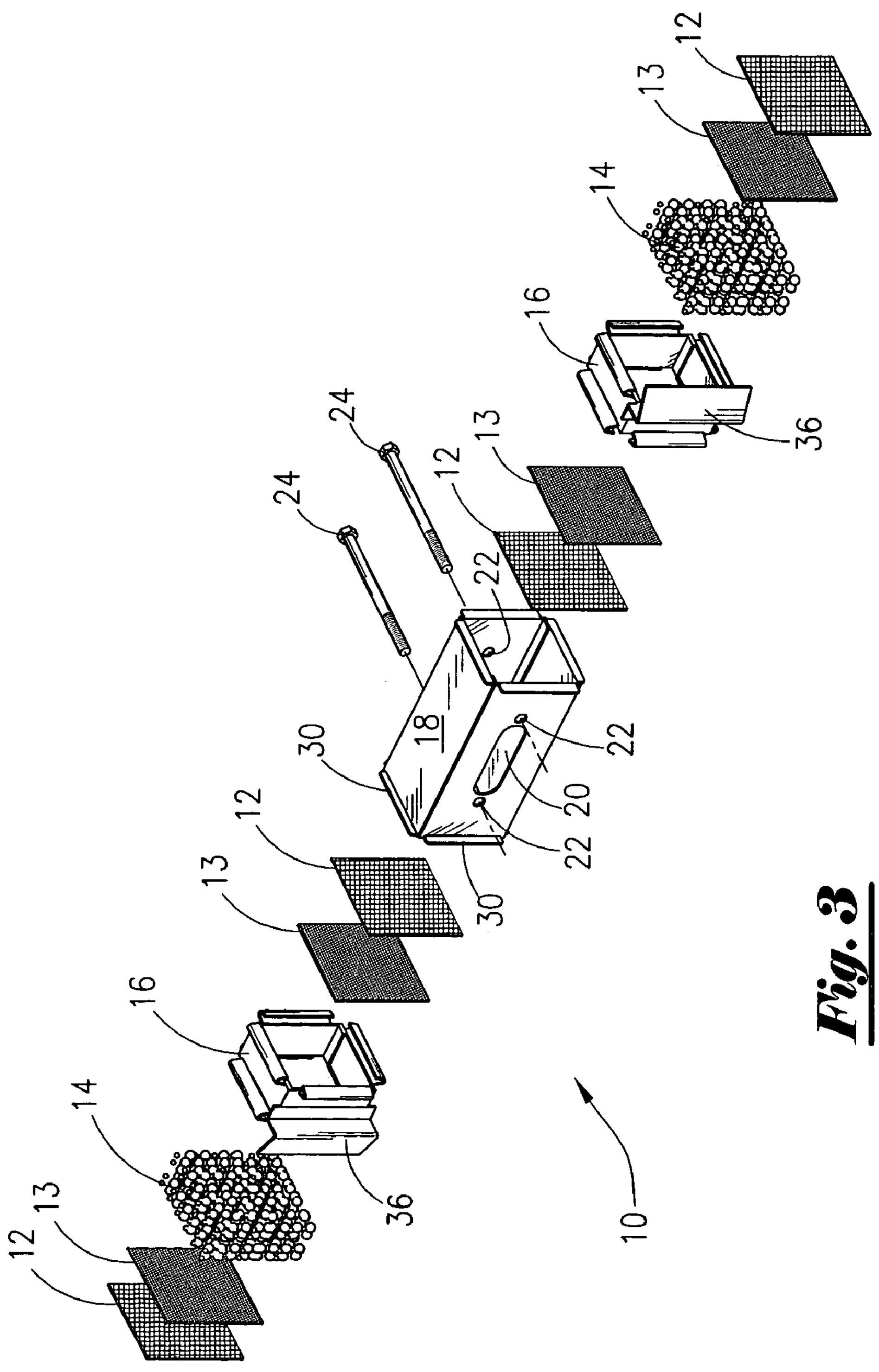
FIG. 3 is an exploded perspective view of the Applicant's infrared emitter.
Figure 4:
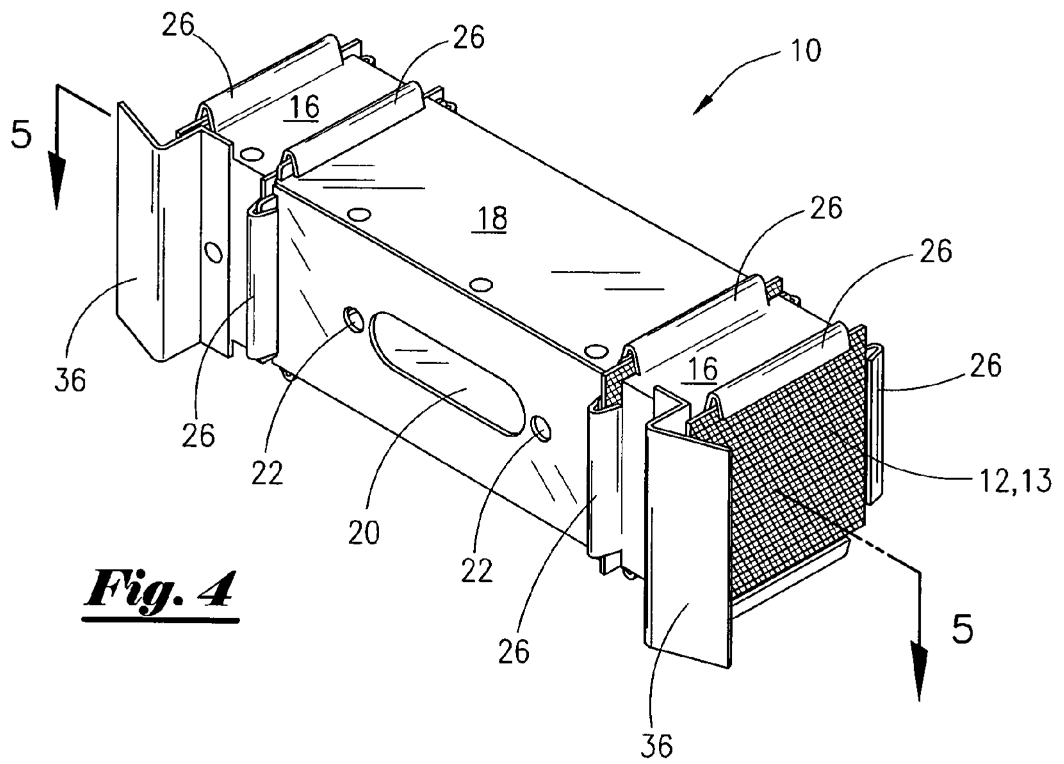
FIG. 4 is an isometric view of the Applicant's infrared emitter.
Figure 5:
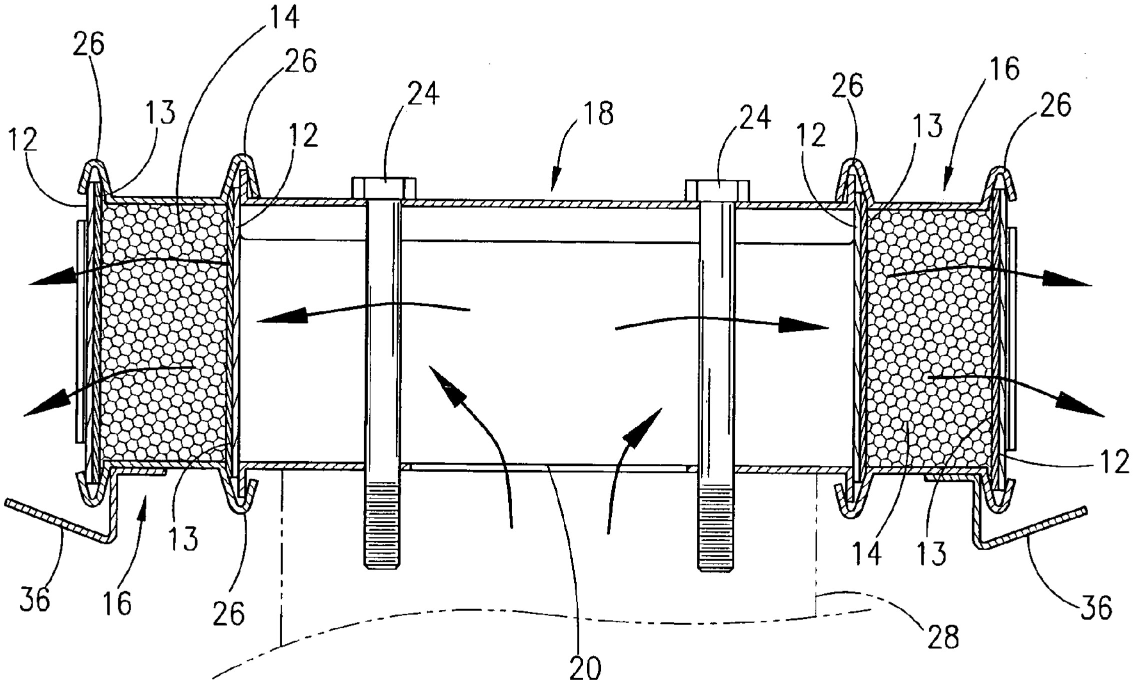
FIG. 5 is a cross-sectional side view of the Applicant's infrared emitter.

The infrared emitter 10 is more clearly shown in FIGS. 3, 4 and 5. The emitter 10 has a box-like housing 18 having a top wall, a bottom wall and two side walls though other configurations, such as cylindrical housing, could be utilized. The top wall, bottom wall and two side walls of the housing 18 form a flange portion 30 to allow for engagement with heating conduits 16.

The housing 18 may be of any suitable material that is capable of withstanding the extreme temperatures of the combustion gases expelled from the target's engine 34. The housing 18 is equipped with at least one opening 20 in at least one of its side walls to allow for its attachment to the exhaust system of the engine 34 of an aerial target 28. Each side wall is provided with an engine attachment means shown here as bores 22 with attachment bolts 24 to allow for attachment of the emitter 10 to the exhaust system of the engine 34 of an aerial target 28.

The heating conduits 16, here shown as a rectangular box shape, include a top wall, bottom wall and two side walls. The edge of each conduit wall is equipped with an attachment means 26 for securing the heating conduit 16 to the housing 18. As illustrated, the attachment means 26 are shown as a fold portion 26 on the edge of each wall. However, it may evident to one skilled in the art that a variety of attachment means may be used to secure the heating conduits to the housing 18.

The illustrated fold portion 26 engages with the flange portions 30 of the housing 18 and provides a secure connection between the two components. Also, included in the present invention is a deflector portion 36. The deflector portion 36 is of an L-shape and serves to deflect heat away from the engine 34.

The heating conduits 16 contain a network of screens 12, 13 and high heat-resistant beads 14. The network comprises a plurality of screens 12, 13 that are parallel and extend vertically in relation to each other. The screens 12, 13 extend throughout the conduits 16, intersecting the top wall of the conduit 16 and extending to and intersecting with the bottom wall of the conduit 16. The screens 12, 13 may be comprised of a variety of grades and mesh.

The heat-resistant beads 14 are disposed along and between the plurality of vertically extending screens 12, 13 in such a manner that each and every bead 14 is positioned so that it is in direct contact with another bead 14. The beads 14 are of a size and shape such that the infrared signature emitted is substantially similar to that of an authentic aircraft.

It is thought that beads 14 made of metal or ceramic beads coated with platinum or metals from the platinum group such as rhodium and palladium would produce temperatures in the range of 750° Centigrade to 800° Centigrade or greater when heated by the engine exhaust and will provide an energy density of at least fifteen (15) watts per steradian in the mid-band of the infrared spectrum. Such beads are typically employed in catalytic converters for automobile exhaust systems. Beads made of ceramics alone or beads of platinum alloys or alloys from the platinum group that are capable of producing substantially the same temperatures and substantially the same energy densities might also be utilized.

Although the beads 14 are shown as having a substantially spherical shape, it may be evident by one skilled in the art that a wide variety in the number of heat-resistant beads 14, in addition to different shapes, patterns, indentations, sizes, surfaces may be employed to achieve a range of infrared signatures. Similarly, it is thought that stainless steel would be a suitable material for the housing 18 and the screens 12, 13, however the housing and screens may be constructed of a variety of heat resistant materials.

In use, the infrared emitter 10 is attached to the exhaust port of the aerial target 28 by way of the housing opening 20 and attachment bolts 24. During operation, the aerial target's engine 34 produces and expels hot exhaust gases. As shown in FIG. 5, these exhaust gases are expelled through the exhaust ports of the engine 34 into the emitter 10 through the housing opening 20. These hot gases in turn are directed by the housing 18 to and through the heating conduits 16 of the emitter 10 which in turn heat the beads 14 retained in network of screens 12, 13. This heating causes the beads 14 to glow and produce the desired infrared signature. The heated exhaust gases from the engine 34, in combination and the heating conduits 16 of the emitter 10, typically produces a glow in the "white hot" range and thus provides an infrared signal that is detectable by the guidance systems typically employed on missile systems.

I claim:

1. An infrared emitter for producing a target signal, comprising:

a. a housing;

b. a network of screens and heat-resistant beads retained in said housing; and c. means for attaching said housing to an exhaust port of an engine whereby said beads are heated from the heat produced from said exhaust port of said engine.

2. The infrared emitter of claim 1, wherein said housing is comprised of a high temperature resistant material.

3. The emitter of claim 2, wherein said beads are coated with metals from the platinum group.

4. The infrared emitter of claim 1, wherein said network of screens and beads includes:

a. a plurality of parallel vertically extending screens, and b. a plurality of platinum coated beads, disposed along and between said plurality of parallel vertically extending screens.

5. The infrared emitter of claim 4, wherein each said bead of said plurality of beads is positioned to be in contact with a different bead.

6. The infrared emitter as recited in claim 5 wherein said housing and said screens are made of stainless steel.

* * * * *